United States Patent
Flasza et al.

(10) Patent No.: US 9,081,081 B2
(45) Date of Patent: Jul. 14, 2015

(54) DIODE SWITCHED FRONT END FOR GUIDED WAVE RADAR LEVEL TRANSMITTER

(71) Applicant: Magnetrol International, Incorporated, Downers Grove, IL (US)

(72) Inventors: Michael D. Flasza, Schaumburg, IL (US); Feng Tang, Geneva, IL (US)

(73) Assignee: Magnetrol International, Incorporated, Aurora, IL (US)

( * ) Notice: Subject to any disclaimer, the term of this patent is extended or adjusted under 35 U.S.C. 154(b) by 312 days.

(21) Appl. No.: 13/668,775

(22) Filed: Nov. 5, 2012

(65) Prior Publication Data

US 2014/0125514 A1 May 8, 2014

(51) Int. Cl.
| | |
|---|---|
| G01S 13/08 | (2006.01) |
| G01S 7/03 | (2006.01) |
| G01F 23/284 | (2006.01) |
| G01S 13/88 | (2006.01) |

(52) U.S. Cl.
CPC ............. *G01S 7/03* (2013.01); *G01F 23/284* (2013.01); *G01S 13/88* (2013.01)

(58) Field of Classification Search
CPC .... G01F 23/284; G01S 13/0209; G01S 13/88
USPC ........................................ 342/118, 124, 175
See application file for complete search history.

(56) References Cited

U.S. PATENT DOCUMENTS

| | | | |
|---|---|---|---|
| 4,226,118 A | 10/1980 | Aldrich | |
| 4,833,918 A | 5/1989 | Jean et al. | |
| 5,517,198 A | 5/1996 | McEwan | |
| 5,610,611 A * | 3/1997 | McEwan | 342/89 |
| 8,020,438 B2 * | 9/2011 | Miskell et al. | 73/290 R |
| 8,264,401 B1 * | 9/2012 | Kavaler | 342/128 |
| 2008/0048905 A1 * | 2/2008 | McEwan | 342/21 |
| 2014/0253367 A1 * | 9/2014 | Michalski | 342/124 |

FOREIGN PATENT DOCUMENTS

| | | |
|---|---|---|
| WO | WO 96/19715 | 6/1996 |
| WO | WO2004/018978 | 3/2004 |

* cited by examiner

*Primary Examiner* — John B Sotomayor
*Assistant Examiner* — Marcus Windrich
(74) *Attorney, Agent, or Firm* — Wood, Phillips, Katz, Clark & Mortimer

(57) ABSTRACT

A guided wave radar level measurement instrument comprises a probe defining a transmission line for sensing material level. A pulse circuit is connected to the probe for generating pulses on the transmission line and receiving reflected signals from the transmission line. The pulse circuit comprises a pulse generator for generating a transmit pulse, a bridge circuit having a diode switched front end connected between the pulse generator and a differential circuit. The transmission line is connected to one side of the differential circuit. Generated pulses from the pulse generator are supplied to both sides of the differential circuit and reflected signals from the transmission line are supplied to one side of the differential circuit.

20 Claims, 3 Drawing Sheets

DIODE SWITCHED FRONT END FOR GUIDED WAVE RADAR LEVEL TRANSMITTER

CROSS-REFERENCE TO RELATED APPLICATIONS

Not Applicable.

FEDERALLY SPONSORED RESEARCH OR DEVELOPMENT

Not Applicable.

MICROFICHE/COPYRIGHT REFERENCE

Not Applicable.

FIELD OF THE INVENTION

This invention relates to process control instruments, and more particularly, to a diode switched front end circuit for a guided wave radar instrument.

BACKGROUND

Process control systems require the accurate measurement of process variables. Typically, a primary element senses the value of a process variable and a transmitter develops an output having a value that varies as a function of the process variable. For example, a level transmitter includes a primary element for sensing level and a circuit for developing an electrical signal proportional to sensed level.

Knowledge of level in industrial process tanks or vessels has long been required for safe and cost-effective operation of plants. Many technologies exist for making level measurements. These include buoyancy, capacitance, ultrasonic and microwave radar, to name a few. Recent advances in micropower impulse radar (MIR), also known as ultra-wideband (UWB) radar, in conjunction with advances in equivalent time sampling (ETS), permit development of low power and lost cost time domain reflectometry (TDR) instruments.

In a TDR instrument, a very fast (about 1 nanosecond) electric pulse with a rise time of 500 picoseconds, or less, is propagated down a probe, that serves as a transmission line, in a vessel. The pulse is reflected by a discontinuity caused by a transition between two media. For level measurement, that transition is typically where the air and the material to be measured meet. These instruments are also known as guided wave radar (GWR) measurement instruments.

With a TDR instrument using a single probe, it is necessary to couple the electronic circuitry to the transmission line so that the reflected pulses are separated from the transmitted pulses. One known type of circuit uses a resistance bridge such as is described in U.S. Pat. No. 5,517,198. The bridge couples a transmit pulse to a transmission line. The opposite side of the resistance bridge is coupled to a balancing load. Close-in performance can be enhanced by the use of this circuit in combination with a differential amplifier to cancel or null the transmit pulse from the detected output to allow improved close-in measurement. However, the transmit pulse amplitude is reduced by the resistance divider effect of the bridge. Also, some of the reflected signal bleeds over to the negative channel of the differential amplifier circuit which reduces receiver sensitivity. It is difficult to provide an excellent 50 ohm termination to the transmission line which may result in received pulses being re-reflected due to a less than perfect impedance match at the transmission line origin.

Other known products use variations of the resistance bridge and are adapted to peak or sharpen the transmit pulse. However, the reactance of such a circuit is a factor in impedance matching the transmission line termination. This makes a precise broadband match difficult to achieve.

Another known circuit uses an electronic microwave switch in the transmit/receive path. However the switch response is slow compared to signal propagation speeds. This type of circuit requires a long electrical delay line to give the switch time to operate before signals must be detected. Also, a microwave switch is a relatively expensive component.

The present invention is directed to solving one or more of the problems discussed above in a novel and simple manner.

SUMMARY

As described herein, a guided wave radar instrument uses a diode switched front end to overcome disadvantages of prior pulse circuits.

There is disclosed in accordance with one aspect of the invention a guided wave radar level measurement instrument comprising a probe defining a transmission line for sensing material level. A pulse circuit is connected to the probe for generating pulses on the transmission line and receiving reflected signals from the transmission line. The pulse circuit comprises a pulse generator for generating a transmit pulse, a bridge circuit having a diode switched front end connected between the pulse generator and a differential circuit. The transmission line is connected to one side of the differential circuit. Generated pulses from the pulse generator are supplied to both sides of the differential circuit and reflected signals from the transmission line are supplied to one side of the differential circuit.

It is a feature that the diode switched front end comprises a pair of common cathode diodes.

It is another feature that the diode switched front end comprises a low impedance switch.

It is a further feature that the transmit pulse is supplied to both sides of the differential circuit to cancel out the transmit pulse.

It is another feature that the differential circuit filters and samples signals supplied to two sides of a differential amplifier. The differential circuit cancels common mode components.

It is an additional feature that the pulse circuit further comprises a termination resistor connected to the transmission line for impedance matching.

It is an additional feature that the diode switched front end blocks the reflected signals from one side of a differential circuit.

It is yet another feature that the diode switched front end blocks the pulse generator from the differential circuit in the absence of a transmit pulse.

It is still another feature that the diode switched front end comprises a pair of microwave diodes.

There is disclosed in accordance with another aspect of the invention a time domain reflectometry measurement instrument comprising a probe defining a transmission line for sensing material level. A pulse circuit is connected to the probe for generating pulses on a transmission line and receiving reflected signals from the transmission line. The pulse circuit comprises a pulse generator for generating a transmit pulse. A bridge circuit has a diode switched front end connected between the pulse generator and a differential circuit. The transmission line is connected to one side of the differential circuit. Generated pulses from the pulse generator are supplied to both sides of the differential circuit and the reflected pulses from the transmission line are supplied to one side of the differential circuit. A sampling circuit controls operation of the pulse generator and controls sampling of the differential circuit to implement equivalent time sampling of the reflected signal.

Other features and advantages will be apparent from a review of the entire specification, including the appended claims and drawings.

DETAILED DESCRIPTION

Figure 1:
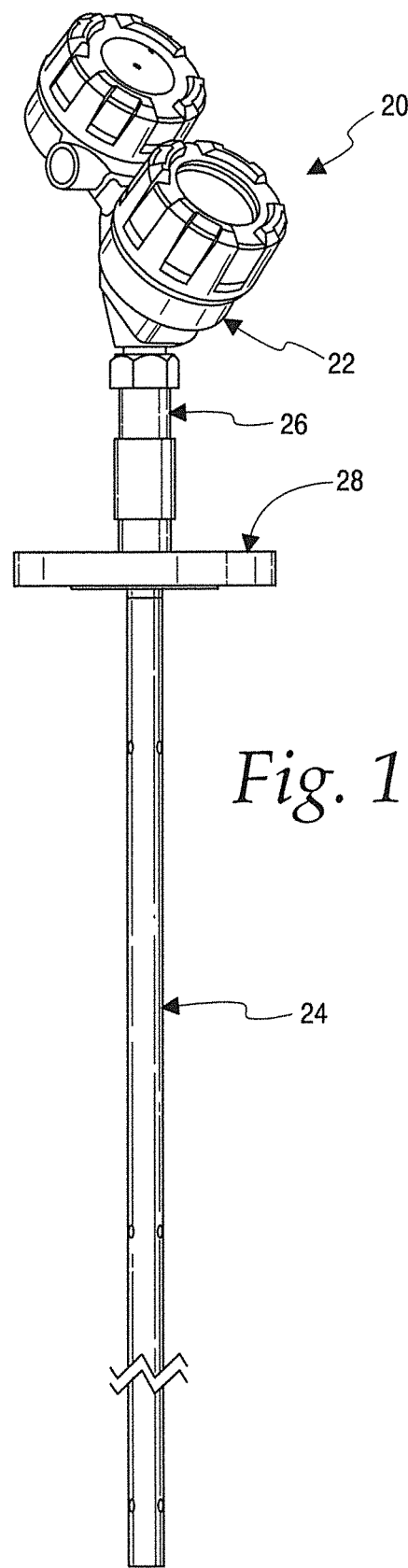
FIG. 1 is an elevation view of a guided wave radar instrument in accordance with the invention.

Referring to FIG. 1, a process instrument 20 is illustrated. The process instrument 20 uses pulsed radar in conjunction with equivalent time sampling (ETS) and ultra-wide band (UWB) transceivers for measuring level using time domain reflectometry (TDR). Particularly, the instrument 20 uses guided wave radar for sensing level. While the embodiment described herein relates to a guided wave radar level sensing apparatus, various aspects of the invention may be used with other types of process instruments for measuring various process parameters.

The process instrument 20 includes a control housing 22, a probe 24, and a connector 26 for connecting the probe 24 to the housing 22. The probe 24 is mounted to a process vessel V using a flange 28. The housing 22 is then secured to the probe 24 as by threading the connector 26 to the probe 24 and also to the housing 22. The probe 24 comprises a high frequency transmission line which, when placed in a fluid, can be used to measure level of the fluid. Particularly, the probe 24 is controlled by a controller 30, described below, in the housing 22 for determining level in the vessel V.

As described more particularly below, the controller 30 generates and transmits pulses on the probe 24. A reflected signal is developed off any impedance changes, such as the liquid surface L of the material being measured. A small amount of energy may continue down the probe 24. In addition to detecting the surface L, the instrument 20 has the ability to measure the location of an interface I between two immiscible liquids of differing density and dielectric properties, such as oil over water, as indicated. Provided the upper layer of oil is sufficiently thick, another reflected signal is developed off the interface I between the oil and water. Under normal conditions, two discernible pulses will be returned including a level pulse representing material level L and an interface pulse representing interface level I.

Guided wave radar combines TDR, ETS and low power circuitry. TDR uses pulses of electromagnetic (EM) energy to measure distance or levels. When a pulse reaches a dielectric discontinuity then a part of the energy is reflected. The greater the dielectric difference, the greater the amplitude of the reflection. In the measurement instrument 20, the probe 24 comprises a wave guide with a characteristic impedance in air. When part of the probe 24 is immersed in a material other than air, there is lower impedance due to the increase in the dielectric. When the EM pulse is sent down the probe it meets the dielectric discontinuity, a reflection is generated.

ETS is used to measure the high speed, low power EM energy. The high speed EM energy (1000 foot/microsecond) is difficult to measure over short distances and at the resolution required in the process industry. ETS captures the EM signals in real time (nanoseconds) and reconstructs them in equivalent time (milliseconds), which is much easier to measure. ETS is accomplished by scanning the wave guide to collect thousands of samples. Approximately five scans are taken per second.

Figure 2:
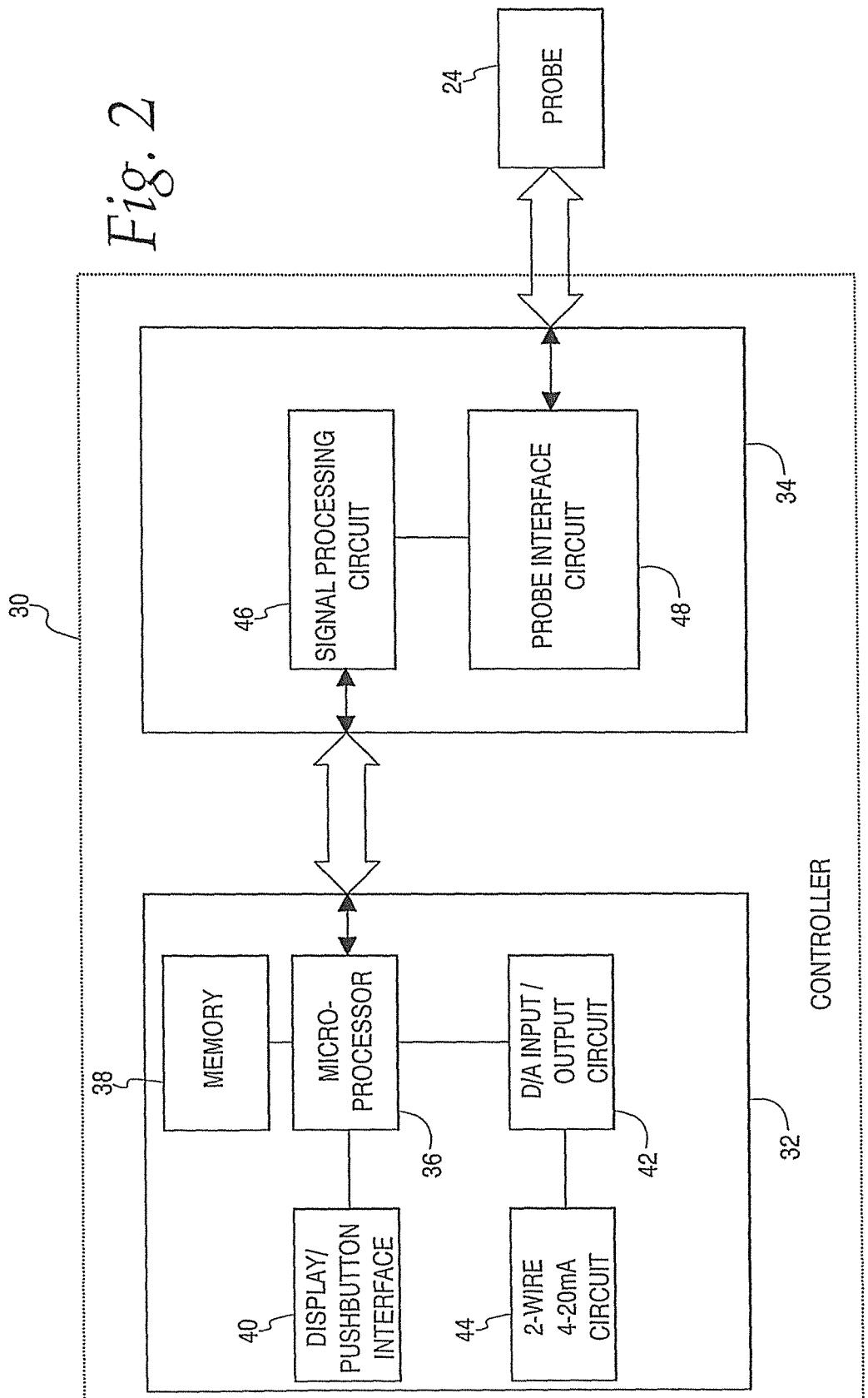
FIG. 2 is a block diagram of the instrument of FIG. 1.

Referring to FIG. 2, the electronic circuitry mounted in the housing 22 of FIG. 1 is illustrated in block diagram form as an exemplary controller 30 connected to the probe 24. As will be apparent, the probe 24 could be used with other controller designs. The controller 30 includes a digital circuit 32 and an analog circuit 34. The digital circuit 32 includes a microprocessor 36 connected to a suitable memory 38 (the combination forming a computer) and a display/push button interface 40. The display/push button interface 40 is used for entering parameters with a keypad and displaying user and status information. The memory 38 comprises both non-volatile memory for storing programs and calibration parameters, as well as volatile memory used during level measurement. The microprocessor 36 is also connected to a digital to analog input/output circuit 42 which is in turn connected to a two-wire circuit 44 for connecting to a remote power source. Particularly, the two-wire circuit 44 utilizes loop control and power circuitry which is well known and commonly used in process instrumentation. The two-wire circuit 44 controls the current on the two-wire line in the range of 4-20 mA which represents level or other characteristics measured by the probe 24.

The microprocessor 36 is also connected to a signal processing circuit 46 of the analog circuit 34. The signal processing circuit 46 is in turn connected via a probe interface circuit 48 to the probe 24. The probe interface circuit 48 includes an ETS circuit which converts real time signals to equivalent time signals, as discussed above. The signal processing circuit 46 processes the ETS signals and provides a timed output to the microprocessor 36, as described more particularly below.

The general concept implemented by the ETS circuit is known. The probe interface circuit 48 generates hundreds of thousands of very fast (about 1 nanosecond) pulses of 500 picoseconds or less rise time every second. The timing between pulses is tightly controlled. The reflected pulses are sampled at controlled intervals. The samples build a time multiplied "picture" of the reflected pulses. Since these pulses travel on the probe 24 at the speed of light, this picture represents approximately ten nanoseconds in real time for a five-foot probe. The probe interface circuit 48 converts the time to about seventy-one milliseconds. As is apparent, the exact time would depend on various factors, such as, for example, probe length. The largest signals have an amplitude on the order of twenty millivolts before amplification to the desired amplitude by common audio amplifiers. For a low power device, a threshold scheme is employed to give interrupts to the microprocessor 36 for select signals, namely, fiducial, target, level, and end of probe, as described below. The microprocessor 36 converts these timed interrupts into distance. With the probe length entered through the display/push button interface 40, or some other interface, the microprocessor 36 can calculate the level by subtracting from the probe length the difference between the fiducial and level distances. Changes in measured location of the reference target can be used for velocity compensation, as necessary or desired.

Figure 3:
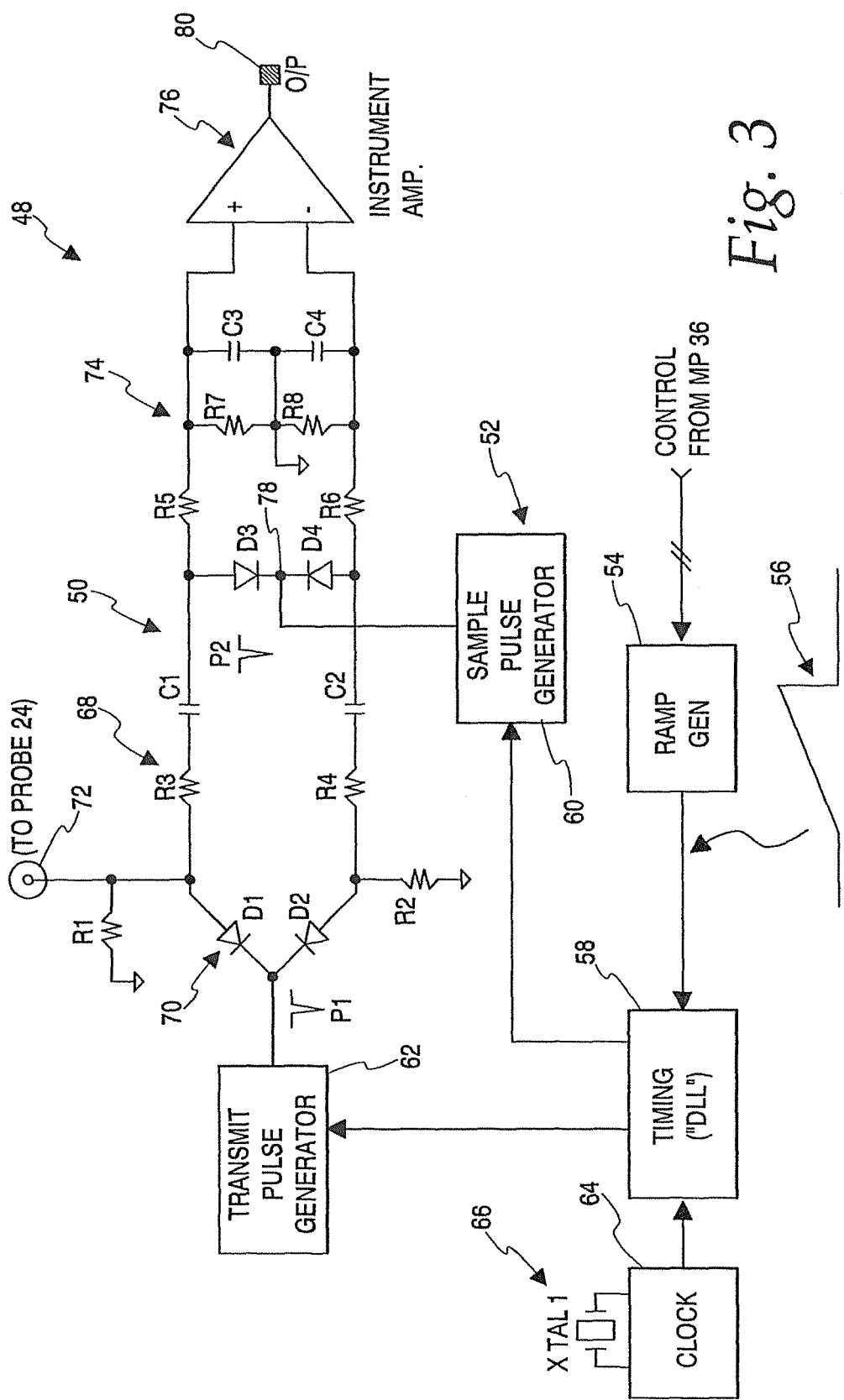
FIG. 3 is a combined block diagram and electrical schematic illustrating a diode switched front end of the instrument of FIG. 1.

Referring to FIG. 3, a portion of the probe interface circuit 48 is illustrated. The probe interface circuit 48 comprises a pulse circuit 50 connected to the probe 24 for generating pulses on the transmission line and receiving reflected signals from the transmission line. The pulse circuit 50 is controlled by a timing circuit 52 under control of the microprocessor 36.

The timing circuit 52 includes a ramp generator 54 controlled by the microprocessor 36. Particularly, the microprocessor 36 controls the initiation of a ramp signal 56 supplied to a timing block 58. The timing block 58 may comprise a delay lock loop (DLL) for generating timing signals for controlling a sample pulse generator 60 and a transmit pulse generator 62. The timing block 58 is coupled to a clock 64 controlled by a crystal 66.

The ramp generator 54, the timing block 58 and the clock 64 comprise a set of functions that are used commonly in GWR instruments to implement the equivalent time sampling function, discussed above. A transmit pulse P1 of approximately 1 nanosecond in length is sent down the probe 24 which may be immersed in a liquid of unknown level. A short time later a "sample" pulse P2 is enabled to sample the pulse or pulses which may have been reflected from the probe 24 as it meets the liquid surface or other impedance changes. This allows events that happen on a very fast time scale to be "expanded" via the sampling technique into a slow or "equivalent" time scale.

Particularly, the transmit pulse generator 62 generates the transmit pulse P1 while the sample pulse generator 60 generates the sample pulse P2. Both are negative polarity pulses in the illustrated embodiment.

The pulse circuit 50 comprises a bridge circuit 68 having a diode switched front end 70 in the form of diodes D1 and D2 having a common cathode. The diode switched front end 70 may be formed, for example, by a type HSMS-2814 Schottky barrier diode circuit. The anode of the diode D1 is connected to a terminal 72 for connection to the probe 24. A termination resistor R1 is connected between the terminal 72 and ground for impedance matching. A resistor R2 is connected between the anode of the second diode D2 to ground to provide symmetry. The anodes of the diodes D1 and D2 are connected via respective resistors R3 and R4 to a differential circuit 74. The resistor R3 is connected in series with a capacitor C1 and a resistor R5 to the plus (+) side of an instrument amplifier 76 which is also referred to as a differential amplifier. The resistor R4 is connected in series with a capacitor C2 and resistor R6 to the minus (−) side of the instrument amplifier 76. A pair of diodes D3 and D4 having a common cathode at a node 78 are connected across the junction between the capacitor C1 and resistor R5 and the capacitor C2 and the resistor R6, respectively. The node 78 is connected to the sample pulse generator 60. Resistors R7 and R8 are connected in series across the input side of the instrument amplifier 76. Capacitors C3 and C4 are also connected across the input of the instrument amplifier 76. The junction of the resistors R7 and R8 is connected to the junction of the capacitors C3 and C4 and to ground. The instrument amplifier output 80 is supplied to the signal processing circuit 46 for determining level measurement.

When the transmit pulse P1 is fired, the diodes D1 and D2 simultaneously conduct. The pulse P1 appears at the terminal 72 and is therefore sent out the probe 24 toward the liquid surface. When this fast pulse encounters a liquid surface in the form of an impedance change, a portion of the pulse is reflected and will appear as an incoming signal at the terminal 72. At the same time that the pulse P1 is fired, a nearly identical pulse will appear at the top of the resistor R2 due to the symmetry of the circuit.

In accordance with equivalent time sampling principles, a short time after the transmit pulse P1 is fired, the sample pulse P2 is fired. The delay between the pulses P1 and P2 starts out nearly zero and then is slowly increased by the timing circuit 58 as controlled by the ramp signal 56 so that the reflected portion of the pulse P1 that went out the probe and then returned as a reflected signal is sampled onto the capacitors C1 and C2 by the action of the negative-going sample pulse P2 which causes the sampling diodes D3 and D4 to conduct. The time constant formed by the circuits consisting of the resistor R5 and R7 and capacitors C3, and the resistors R6 and R8 and the capacitor C4, are chosen to be long enough that the sample pulse frequency is removed from the input of the instrumentation amplifier 76 but is not so long that the detected signal, which is a signal of much lower frequency, is removed.

When the transmit pulse P1 is fired, it appears symmetrically at the resistors R1 and R2. The differential circuit 74, as described, includes sampling and filter circuits connected to the differential amplifier 76. The differential amplifier 76 operates by amplifying only the difference between the plus and minus inputs and ignores or cancels the common mode component. Because the transmit pulse P1 effectively appears equally at both sides of the instrument amplifier 76, the transmit pulse is effectively canceled from the output 80. This allows measurement very close to the circuit without long delay lines. A common pulse width for the transmit pulse P1 is about 1 nanosecond which is about 1 foot in free space. Without this transmit pulse cancellation feature, it would be difficult to measure closer than 1 foot to the transmitter unless a cable delay line is used between the transmitter and the probe.

As is apparent, after the transmit pulse P1 has terminated the front end diodes D1 and D2 cease to conduct. The diodes D1 and D2 are advantageously microwave diodes so that they switch on and off very fast. With the diodes D1 and D2 turned off, they are effectively out of the circuit for purposes of detecting the signal reflected from the liquid surface. As such, the diode switched front end 70 operates as a low impedance "switch".

With the described pulse circuit 50, it is easy to achieve a good broadband 50 ohm impedance match at the terminal 72. As a result, pulses coming into the pulse circuit 50 are not re-reflected. Because the diodes D1 and D2 are off during the sampling period, no part of the reflected signal appears at the minus side of the differential amplifier 76. This increases overall receiver sensitivity. Moreover, to obtain a fast rise and fall time of the transmit pulse P1, it is common to use peaking components. These are typically an inductor and resistor in the transmit pulse generator 62. These components can cause overshoot in the transmit pulse which is an undesirable characteristic. However, because the diodes D1 and D2 only conduct on the negative going part of the transmit pulse P1, they effectively block any overshoot or ringing that may be caused by over peaking of the pulse P1 as they will cut off during this overshoot. This has the advantage that larger amounts of peaking and/or overshoot can be used to shorten the transmit pulse P1 without fear that the undesirable overshoot/ringing will appear at the terminal 72. Moreover, because the diodes D1 and D2 operate as a low impedance switch while conducting, very little signal is lost between the transmit pulse generator 62 and the transmission line.

Thus, as described, an improved guided wave radar probe utilizes a diode switched front end circuit.

It will be appreciated by those skilled in the art that there are many possible modifications to be made to the specific forms of the features and components of the disclosed embodiments while keeping within the spirit of the concepts disclosed herein. Accordingly, no limitations to the specific forms of the embodiments disclosed herein should be read into the claims unless expressly recited in the claims. Although a few embodiments have been described in detail above, other modifications are possible.

The invention claimed is:

1. A guided wave radar level measurement instrument comprising:
   a probe defining a transmission line for sensing material level; and
   a pulse circuit connected to the probe for generating pulses on the transmission line and receiving reflected signals from the transmission line, the pulse circuit comprising a transmit pulse generator for generating a transmit pulse, a bridge circuit having a diode switched front end connected between the transmit pulse generator and a differential circuit, the transmission line being connected to one side of the differential circuit, wherein generated pulses from the transmit pulse generator are supplied to both sides of the differential circuit and reflected signals from the transmission line are supplied to one side of the differential circuit.

2. The guided wave radar level measurement instrument of claim 1 wherein the diode switched front end comprises a pair of common cathode diodes.

3. The guided wave radar level measurement instrument of claim 1 wherein the diode switched front end operates as a low impedance switch.

4. The guided wave radar level measurement instrument of claim 1 wherein the transmit pulse is supplied to both sides of the differential circuit to cancel out the transmit pulse from an output of the differential circuit.

5. The guided wave radar level measurement instrument of claim 1 wherein the differential circuit filters and samples signals supplied to two sides of a differential amplifier.

6. The guided wave radar level measurement instrument of claim 5 wherein the differential circuit cancels common mode components.

7. The guided wave radar level measurement instrument of claim 1 wherein the pulse circuit further comprises a termination resistor connected to the transmission line for impedance matching.

8. The guided wave radar level measurement instrument of claim 1 wherein the diode switched front end blocks the reflected signals from one side of the differential circuit.

9. The guided wave radar level measurement instrument of claim 1 wherein the diode switched front end blocks the transmit pulse generator from the differential circuit in the absence of a transmit pulse.

10. The guided wave radar level measurement instrument of claim 1 wherein the diode switched front end comprises a pair of microwave diodes.

11. A time domain reflectometry measurement instrument comprising:
    a probe defining a transmission line for sensing material level;
    a pulse circuit connected to the probe for generating pulses on the transmission line and receiving reflected signals from the transmission line, the pulse circuit comprising a transmit pulse generator for generating a transmit pulse, a bridge circuit having a diode switched front end connected between the transmit pulse generator and a differential circuit, the transmission line being connected to one side of the differential circuit, wherein generated pulses from the transmit pulse generator are supplied to both sides of the differential circuit and reflected pulses from the transmission line are supplied to one side of the differential circuit; and
    a timing circuit controlling operation of the transmit pulse generator and controlling sampling of the differential circuit to implement equivalent time sampling of the reflected signal.

12. The time domain reflectometry measurement instrument of claim 11 wherein the diode switched front end comprises a pair of common cathode diodes.

13. The time domain reflectometry measurement instrument of claim 11 wherein the diode switched front end operates as a low impedance switch.

14. The time domain reflectometry measurement instrument of claim 11 wherein the transmit pulse is supplied to both sides of the differential circuit to cancel out the transmit pulse from an output of the differential circuit.

15. The time domain reflectometry measurement instrument of claim 11 wherein the differential circuit filters and samples signals supplied to two sides of a differential amplifier.

16. The time domain reflectometry measurement instrument of claim 15 wherein the differential circuit cancels common mode components.

17. The time domain reflectometry measurement instrument of claim 11 wherein the pulse circuit further comprises a termination resistor connected to the transmission line for impedance matching.

18. The time domain reflectometry measurement instrument of claim 11 wherein the diode switched front end blocks the received pulses from one side of the differential circuit.

19. The time domain reflectometry measurement instrument of claim 11 wherein the diode switched front end blocks the transmit pulse generator from the differential circuit in the absence of a transmit pulse.

20. The time domain reflectometry measurement instrument of claim 11 wherein the diode switched front end comprises a pair of microwave diodes.

* * * * *